Nov. 19, 1940.   G. HUNT   2,222,507

CLUTCH DRIVEN PLATE

Filed Jan. 12, 1939

Inventor
George Hunt
By Blackmore, Spencer & Olinst
Attorneys

Patented Nov. 19, 1940

2,222,507

UNITED STATES PATENT OFFICE 2,222,507

CLUTCH DRIVEN PLATE

George Hunt, Dayton, Ohio, assignor to General Motors Corporation, Detroit, Mich., a corporation of Delaware Application January 12, 1939, Serial No. 250,593

25 Claims. (Cl. 192—107)

This invention relates to friction clutches. The clutch which constitutes the subject of this invention has been designed particularly for use between the engine shaft and the transmission shaft of a motor vehicle.

An object of the invention is to provide a smooth yieldable engagement of the driving and driven members.

As a further object the invention provides a construction which minimizes the spinning weight of the driven member when the clutch is released in order to change the gear ratio.

As a still further object, the construction to be described provides cushioning means between the peripheral portion and the hub portion of the driven member, whereby the driving torque is resiliently transmitted.

As another object the invention provides a new and inexpensive form of clutch facing, one which obviates the necessity for cutting slots, bending tongues or otherwise deforming that part of the metallic driven member which carries the facings.

Other objects and advantages will be understood from the following description.

The drawing illustrates a single embodiment of the invention. In this drawing.

Figure 1:
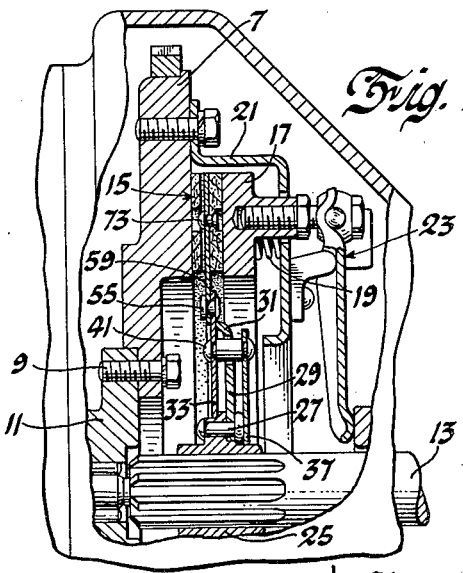
Figure 1 shows the improved clutch in transverse section.
Figure 3:
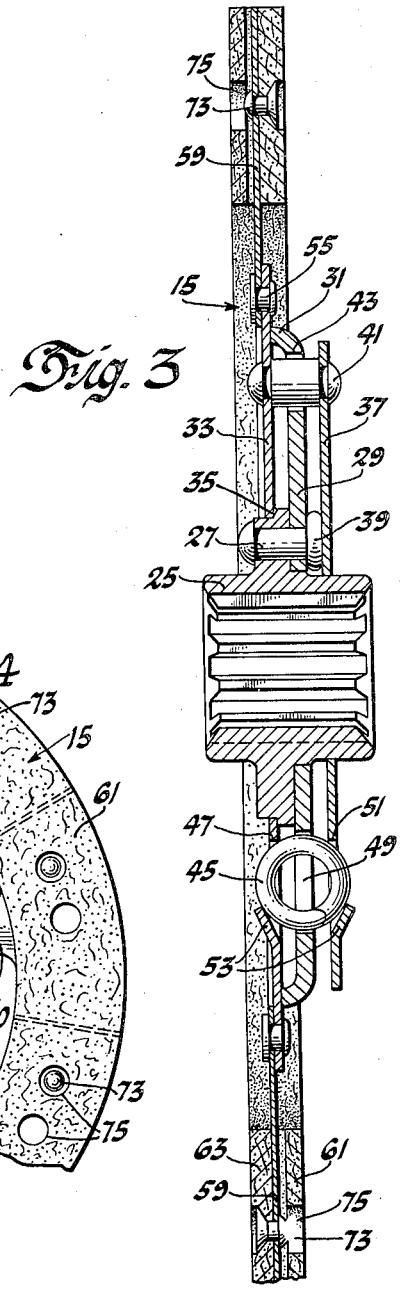
Figure 3 is a section on line 3—3 of Figure 2.
Figure 2:
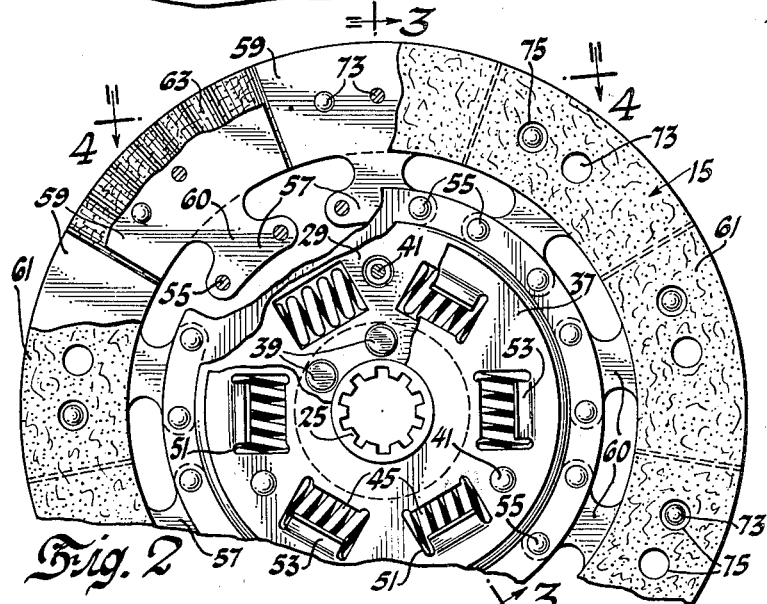
Figure 2 is a view in elevation of the driven member, partly broken away.

The drawing shows a flywheel 7 secured by fastening means 9 to a flange 11 constituting the end of the engine shaft. The transmission shaft 13 carries a driven member which is designated as a whole by numeral 15. The driven member is to be gripped between the flywheel 7 and a pressure plate 17 by means of springs, one of which is shown on the drawing and designated by numeral 19. These springs are located between the pressure plate and a flywheel cover marked 21. Suitable releasing means are shown in Figure 1 and designated as a whole by numeral 23. The releasing mechanism is not a part of this invention and need not be described in detail.

The invention is found in the driven plate 15. This plate includes a hub 25 splined to the drive shaft 13. To the hub is riveted at 27 a flange 29. The flange has its outer margin 31 bent axially from the plane of its major part to engage a driven plate disc 33, the latter supported by the hub and engaging a shoulder 35 on the hub. A retainer plate marked 37 is supported on the hub and engages the heads 39 of the rivets 27. Circumferentially spaced shoulder rivets 71 secure together the retainer 37 and the driven plate 33, passing through enlarged openings 43 in the hub flange with the result that the driven disc and the retainer may have a joint and limited movement of rotation relative to the flange 29. This relative rotation is resiliently resisted by a circumferentially arranged series of coil springs 45 for receiving which registering openings 47, 49 and 51 are formed in the driven plate, hub flange and retainer plate respectively. The springs are held from escaping by tongues 53 on the driven plate and retainer. It may be explained that upon the occurrence of this resiliently resisted relative rotation, a frictional drag occurs between the bent over ends 31 and the driven plate 33 and also between the retainer plate 37 and the heads 39 of the rivets 27.

To the outer margin of the driven plate there are secured by rivets 55, tabs 57 inwardly directed from segmental plates 59. The segmental plates have narrow necks 60 outwardly from the tabs. The segments may be made from relatively light weight spring steel and are flat when assembled, and are also flat when the clutch is released. Facings 61 and 63 of annular form are arranged on opposite sides of the segments. The remote faces of the facings marked 65 and 67 are flat and parallel with each other. These are the surfaces which are engaged by the flat faces of the flywheel and the pressure plate. The adjacent surfaces of the facings, the surfaces in contact with the spring segments, are formed with wavy surfaces, there being alternate valleys 69 and ridges 71. The valleys and ridges extend radially. In assembling the facings on the segments the ridges of one facing are placed opposite the valleys of the other. Rivets 73 are used to attach each facing to each segment, the rivets being located at the ridge of the facing. Openings 75 are formed in the facings to accommodate the rivets. Inasmuch as the ridge of one facing is opposite the valley of the other, the rivets will be circumferentially spaced.

Figure 4:
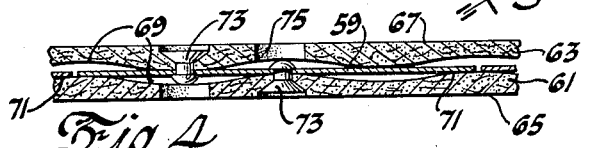
Figures 4 and 5 are sectional views each on the line 4—4 of Figure 2 but showing the parts in different relative positions.
Figure 5:
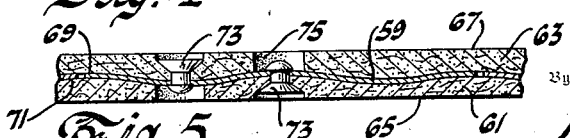

Figure 4 shows a segment and its facings in the clutch released position. Since the ridges of each facing are opposite the valleys of the other, the opposite facings are brought more closely together as the clutch engages, the engaged position being shown by Figure 5. The normally flat spring steel segment is then bent to form corrugations corresponding to the wavy surfaces of the facings. The resilient resistance afforded by the several segments as they are changed in shape from the form shown in Figure 4 to that shown in Figure 5 effects such axial cushioning to clutch engagement as will insure a smooth, non-gripping action. This result is accomplished by the substantially inexpensive expedient of the formation of curved surface facings, and it requires no cutting of slots or bending of tongues in the steel segments. It will be understood that the outline of the ridges and valleys may be made as desired to secure any sort of clutch action. The drawing shows each facing with its surface in the form of a smooth curve. This curve may be made as deep or as shallow as desired for any particular clutch installation. If preferred, the slopes between the ridges and valleys may lack uniformity. The shaping of the facings instead of the distortion of the steel plate affords a convenient means of readily changing the extent and character of the resilient axial resistance to clutch engagement. The outline of the segment shown is now regarded as preferable, although, without departing from the inventive idea, innumerable other forms may be used. Also in place of riveted segments just such facings may be used on opposite sides of the peripheral portion of an integral driven plate wherein the equivalents of the segments are formed by cutting slots as desired to permit plate distortion. The number of segments, whether attached or integral, may be as desired. If the number of segments is sufficiently large it would be unnecessary to attach both facings to each segment. It might also be mentioned that the corrugations in opposite facings may vary in depth.

I claim:

1. In a clutch, a first clutch member having parts relatively movable toward and from each other, a second member having a resiliently flexible portion adapted to be gripped between said parts, a friction facing between each part and said portion, each facing having that surface which is adjacent the second member corrugated to form ridges and valleys, the ridges of each facing being opposed to the valleys of the other, whereby the second member is flexed to conform with said corrugations when the clutch is brought into engagement.

2. The invention defined by claim 1, together with means attaching each facing at its ridges to said portion.

3. In a clutch, a first member having parts mounted for relative movements of approach and separation, a second member adapted to be gripped between said parts, said second member including a normally flat spring element, facings on opposite sides of said element, said facings having their adjacent surfaces corrugated to form ridges and valleys, the ridges of one facing being opposite the valleys of the other.

4. In a clutch, a first member having parts mounted for relative movements of approach and separation, a second member adapted to be gripped between said parts, said second member including a normally flat spring element, facings on opposite sides of said element, said facings having their adjacent surfaces corrugated to form radially elongated ridges and valleys, the ridges of one facing being opposite the valleys of the other.

5. The invention defined by claim 3, together with means to attach the facings to the spring element at the ridges.

6. The invention defined by claim 4, said second member further including a disc and a plurality of spring segments secured to the periphery thereof, said segments together constituting said spring element.

7. In a clutch, a driven member having a radially interrupted ring of spring steel, friction facings on opposite sides of said ring, the adjacent surfaces of said facings having a plurality of ridges with valleys therebetween each ridge of each facing being opposite a valley of the other facing.

8. In a clutch, a driven member having a radially interrupted ring of spring steel, friction facings on opposite sides of said ring, the adjacent surfaces of said facings having alternating radially elongated valleys and ridges, the ridges of one facing being opposite the valleys of the other.

9. The invention defined by claim 7, said ring consisting of a plurality of circumferentially arranged segments.

10. The invention defined by claim 7, said ring consisting of a plurality of circumferentially arranged segments, the said facings being secured to the segments at their ridges.

11. The invention defined by claim 7, said ring consisting of a plurality of circumferentially arranged segments, the remote surfaces of said facings being flat and parallel to each other.

12. In a clutch, a driven member including an interrupted resilient marginal ring, annular friction facings on opposite sides of said ring, said facings having on their adjacent surfaces projecting regions and depressed regions, the projections of one being opposite the depressions of the other, said ring being in contact with said facings only at the projections in clutch release position but engaging substantially the whole of the surfaces of said facings in clutch engaging position.

13. In a friction clutch driven plate assembly, a mounting disc having a peripheral region comprising a plurality of circumferentially separated, normally flat cushions of thin readily distortable resilient sheet metal, lying in a common plane when unstressed, and friction facings attached to said cushion members on opposite sides thereof and having undulated inner faces adapted to distort said cushion members out of said common plane during clutch packing.

14. In a friction clutch driven plate assembly, a hub, a mounting disc comprising a central disc portion of relatively heavy sheet metal secured to said hub and a peripheral region comprising a plurality of circumferentially separated, readily distortable, normally flat thin sheet metal cushion members each having a reduced neck region attached to said central disc portion and a circumferentially extended cushioning region lying beyond the periphery of said disc portion, and a pair of annular facings attached to said cushion members on opposite sides thereof and having undulated inner faces adapted to distort said cushion members toward undulated shape during clutch packing.

15. In a friction clutch driven plate assembly, a mounting disc having a peripheral region of thin readily distortable resilient sheet metal lying generally in a plane perpendicular to the axis of rotation when undistorted, and friction facings attached to said peripheral region on opposite sides thereof, the outer faces of said facings being flat for engagement with cooperating friction clutch elements, and the inner face of each facing being formed with circumferentially alternating integral high and low regions, the high regions being in contact with the mounting disc and the low regions being spaced therefrom when the disc is undistorted, and the high regions of one facing being disposed opposite the low regions of the other facing, whereby to distort the cushion members axially when packing pressure is applied to the facings, and securing elements extending through high regions of each facing and attaching the same to the cushions.

16. In a friction clutch driven plate assembly, a mounting disc having a peripheral region of thin, readily distortable resilient sheet metal, normally lying flatly in a plane perpendicular to the axis of rotation when undistorted, and friction facings attached to said peripheral region on opposite sides thereof and having undulated inner faces adapted to distort said peripheral region toward conformity with said undulated faces during clutch packing.

17. In a friction clutch driven plate assembly, a mounting disc having a peripheral region comprising a plurality of circumferentially separated cushions of thin, readily distortable resilient sheet metal, and friction facings attached to said cushion members on opposite sides thereof and having undulated inner faces adapted to distort said cushion members toward conformity with said undulated faces during clutch packing.

18. In a friction clutch driven plate assembly, a mounting disc comprising a central disc portion and a peripheral region comprising a plurality of circumferentially separated readily distortable, flat, thin resilient sheet metal cushion members each lying in a plane perpendicular to the axis of rotation when unstressed and having a reduced neck region connecting it to said central disc portion, and friction facings attached to said cushion members on opposite sides thereof and having undulated inner faces adapted to distort said cushion members toward undulated shape during clutch packing.

19. In a friction clutch driven plate assembly, a mounting disc comprising a central disc portion of relatively heavy sheet metal and a peripheral region comprising a plurality of structurally independent readily distortable cushion members of thin resilient sheet metal, attached to said central disc portion and projecting radially therebeyond, and friction facings lying wholly beyond the periphery of said central disc portion and attached to said cushion members on opposite sides thereof, said facings having undulated inner faces adapted to distort said cushion members toward undulated shape during clutch packing.

20. In a friction clutch driven plate assembly, a mounting disc having a peripheral region comprising a plurality of circumferentially separated, readily distortable, cushion members of thin resilient sheet metal, and friction facings attached to said cushion members on opposite sides thereof and having undulated inner faces, the peaks of one face being opposed to the valleys of the other face so that said faces may distort said cushion members toward conformity therewith during clutch packing.

21. In a friction clutch driven plate assembly, a mounting disc having a peripheral region of thin readily distortable resilient sheet metal lying flatly in a plane perpendicular to the axis of rotation when undistorted, and friction facings attached to said peripheral region on opposite sides thereof, the outer faces of said facings being flat for engagement with cooperating friction clutch elements, and the inner face of each facing being formed with circumferentially alternating integral high and low regions, the high regions being in contact with the mounting disc and the low regions being spaced therefrom when the disc is undistorted, and the high regions of one facing being disposed opposite the low regions of the other facing, whereby to distort the cushion members axially when packing pressure is applied to the facings, and securing elements extending through high regions of each facing and attaching the same to the cushions.

22. In a friction clutch driven plate assembly, a mounting disc having a peripheral region of thin readily distortable resilient sheet metal lying flatly in a plane perpendicular to the axis of rotation when undistorted, and friction facings attached to said peripheral region on opposite sides thereof, the outer faces of said facings being flat for engagement with cooperating friction clutch elements, and the inner face of each facing being formed with circumferentially alternating integral high and low regions, the high regions being in contact with the mounting disc, the low regions being spaced therefrom when the disc is undistorted, and the high regions of one facing being disposed opposite the low regions of the other facing, whereby to distort the cushion members axially when the packing pressure is applied to the facings.

23. In a friction clutch driven plate assembly, a mounting disc having a peripheral region comprising a plurality of circumferentially separated, readily distortable, normally flat cushions of thin resilient sheet metal, and friction facings provided with circumferentially spaced projections in contact with the cushions, the projections of one facing being disposed opposite the spaces between the projections of the other facing, whereby to distort the cushion members into said spaces under clutch packing pressure.

24. In a friction clutch driven plate assembly, a mounting disc having a peripheral region of thin readily distortable spring sheet metal lying generally in a plane perpendicular to the axis of rotation when the undistorted, and friction facings attached to said peripheral region on opposite sides thereof, the outer faces of said facings being flat for engagement with cooperating friction clutch elements, and the inner face of each facing being formed with circumferentially alternating integral high and low regions, the high regions being in contact with the mounting disc and the low regions being spaced therefrom when the disc is undistorted, and the high regions of one facing being disposed opposite the low regions of the other facing, whereby to distort the cushion members axially when the packing pressure is applied to the facings.

25. In a friction clutch driven plate assembly, a mounting disc having a peripheral region comprising a plurality of circumferentially separated, readily distortable cushions of thin resilient sheet metal, and friction facings provided with circumferentially spaced projections in contact with the cushions, the projections of one facing being disposed opposite the spaces between the projections of the other facing, whereby to distort the cushion members into said spaces under clutch packing pressure.

GEORGE HUNT.